INVENTOR
Louis H. Von Ohlsen
BY
Blair, Curtis + Hayward
ATTORNEYS

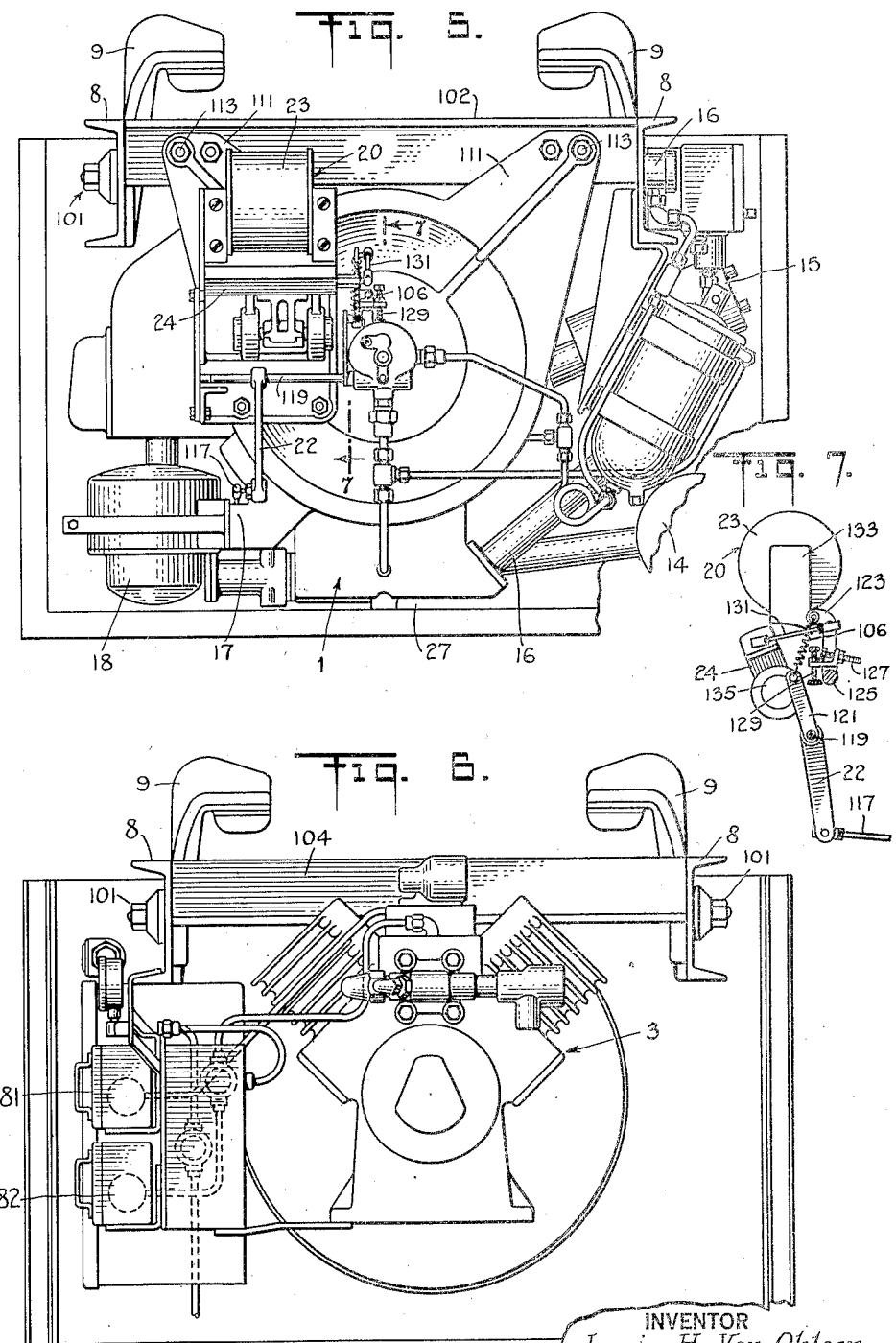

Patented Aug. 31, 1943

2,328,314

UNITED STATES PATENT OFFICE 2,328,314

POWER SYSTEM AND CONTROL THEREFOR

Louis H. Von Ohlsen, New Haven, Conn., assignor to The Safety Car Heating and Lighting Company, Inc., a corporation of Delaware Application August 6, 1941, Serial No. 405,597

12 Claims. (Cl. 290—31)

This invention relates to power equipment and more particularly to the provision of reliable air-conditioning and lighting service of a railway car.

An object of this invention is to provide a reliable source of power for electrical equipment and for refrigeration mechanism. A further object is to provide a dependably controlled power drive for a load such as a generator which may have coupled with it the compressor of a refrigeration system. A further object is to provide apparatus of the above character which is economical to manufacture and operate and sturdy in construction and which is light in weight. Another object is to provide a system of control for apparatus of the above character and to provide a method of operating the same. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings:

Figure 5 is an end elevation of the left-hand end of Figure 3;

Figure 6 is an end elevation of the right-hand end of Figure 3; and

Figure 7 is a view on the line 7—7 of Figure 5.

On railway passenger cars an electrical system is provided to supply power to lights, fans, and other equipment, and the general practice has been to equip each car with an electric generator driven by the car axle and to provide a storage battery of suitable capacity to furnish energy during the periods when the car is idle or moving at low speeds. This type of system has certain disadvantages, particularly with modern cars where there are increased requirements for current to operate the air-conditioning equipment and additional lights. This increased demand for current has created the problem of finding space on the car for the larger batteries which are necessary, and even when space is available, the weight of the battery system has been a serious problem. Furthermore, with an axle-driven generator the power for producing current comes from the locomotive, and with modern trains the heavy electrical load may cause the generator to be such a load as to affect the ability of the locomotive to haul the train at the desired speed.

In addition to these factors, each passenger car should have its own independent power system with sufficient capacity to meet all demands of the particular car, and in fact, this should be independent of the movement of the car, and it should not be necessary to give attention to this system except through regular car servicing. For example, if a car stands in use at a station or on a siding for more than the usual period of time, its power system should still be satisfactory, and it should not be necessary to provide auxiliary equipment or connections to an auxiliary supply of power. It is an object of the present invention to provide a system which meets the above demands and which is not subject to the above limitations. Accordingly, a self-contained power unit is provided for operating the lighting and air-conditioning system and the auxiliaries, and a control is provided which regulates the operation so that the demands are met. In the illustrative embodiment of the invention the power unit operates independently of the movement of the car, and the unit imposes no load on the locomotive except that due to its weight. With this type of unit a smaller storage battery is sufficient, and the over-all weight of the electrical system is at a minimum.

This application is related to my copending application Serial No. 405,596 filed herewith and disclosing the same mechanism as the embodiment of the invention therein claimed; my copending application is directed particularly to the mounting arrangement of the structure, whereas the present application is directed particularly to the operating relationship of the various portions of the apparatus and to the control. My copending application is therefore incorporated herein, and reference may be had thereto for details.

Figure 3:
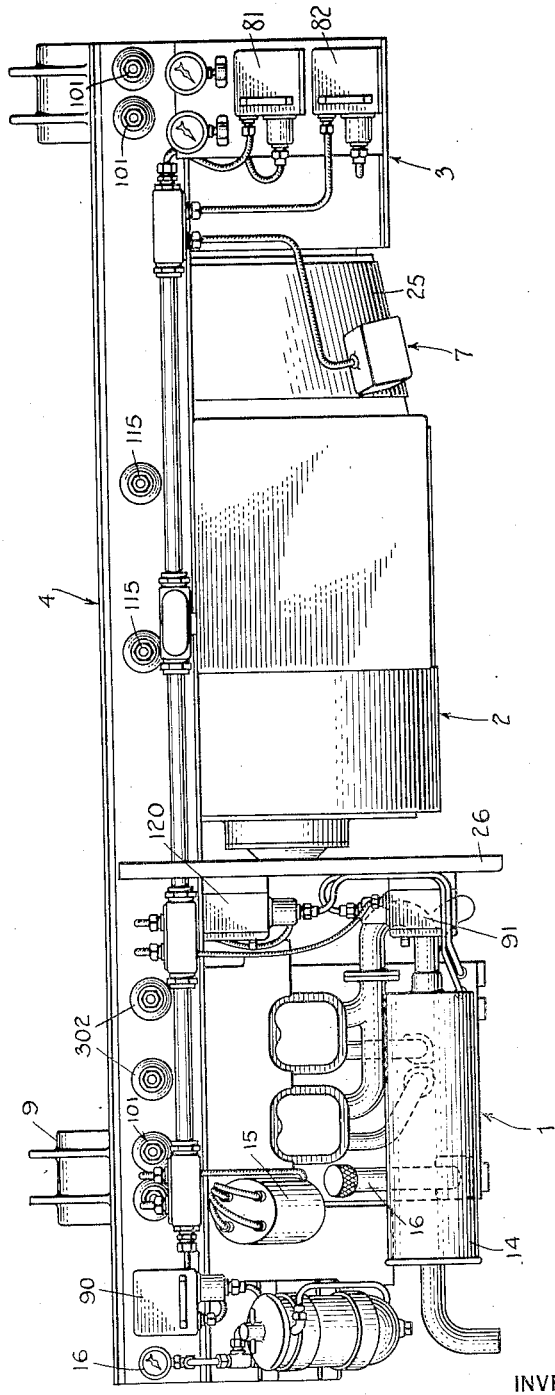
Figure 3 is a side elevation of the power unit for the system of Figure 1.
Figure 4:
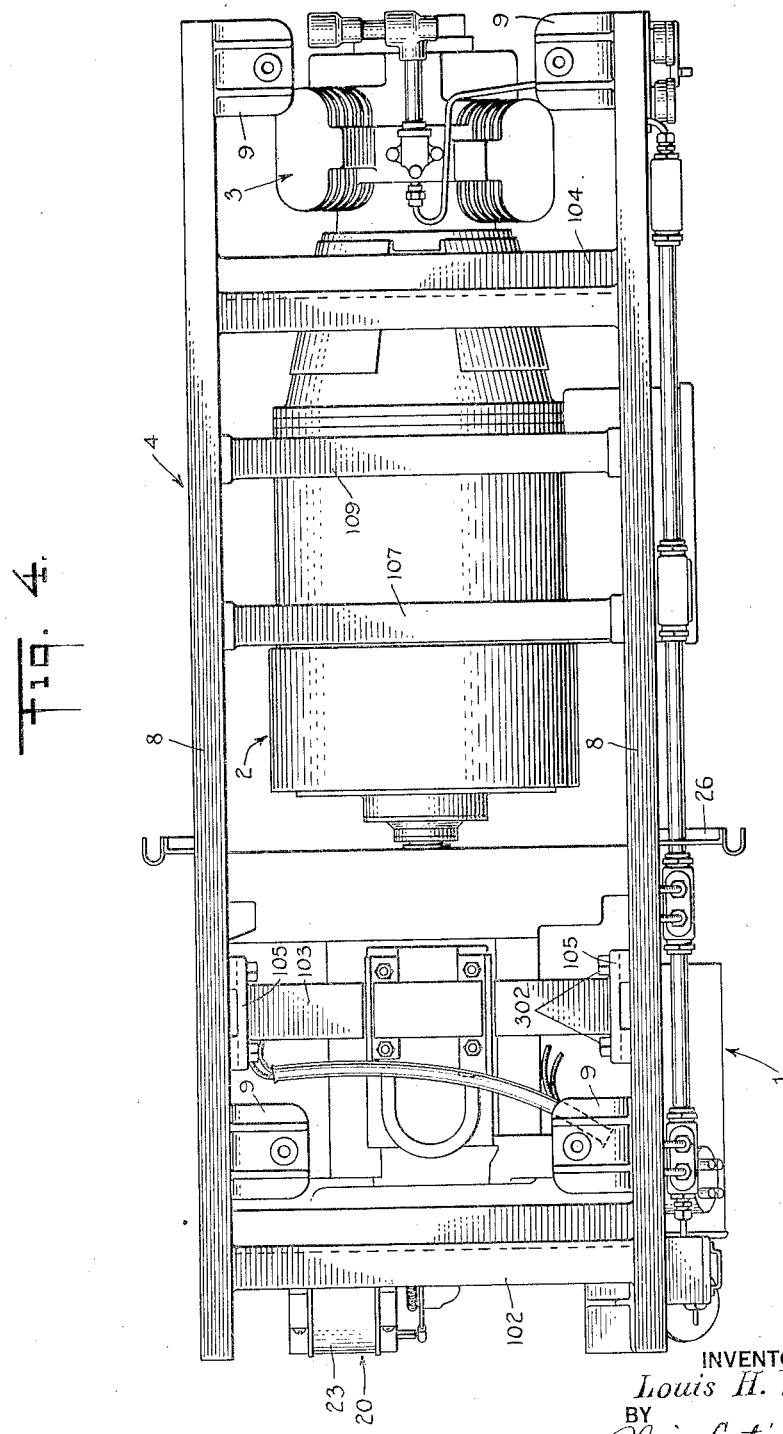
Figure 4 is a top plan view of the structure of Figure 3.

Referring to Figure 3 of the drawings, a rigid rectangular frame 4 (see also Figure 4) is carried upon the car frame beneath the floor of the car, and rigidly mounted upon this frame are an internal combustion engine 1, an electric generator 2, and a compressor 3. The engine, the generator, and the compressor have a common axis (see Figure 1), with the engine and generator shafts connected by a shaft coupling 6 and with the generator and compressor shafts connected through a magnetic coupling 7. Thus, the generator is driven whenever the engine is operated, and the compressor is selectively driven by energizing the magnetic coupling 7. Frame 4 is formed by two parallel channels 8 (Figure 4) and two cross Z-bars 102 and 104, and the frame is supported by four inverted L-brackets 9 which are resiliently carried by the supporting beams of the car floor and which extend downwardly and are bolted to channels 8.

As explained in my copending application, engine 1, generator 2, or compressor 3 may be individually removed for repair or replacement without interfering with the other apparatus. Each of the L-brackets 9 (see Figures 5 and 6) is clamped to its channel 8 by a pair of bolts indicated at 101, and the entire power unit may be removed by removing these four pairs of bolts. Engine 1 is supported by a pipe 103 connected to the central portion of the engine and having fixed to its ends brackets 105 (Figure 4) which rest upon blocks (not shown) welded to the inner surfaces of the channels. Extending through each end bracket 105 and the adjacent channel 8 are two bolts 302 (see also Figure 3). Generator 2 is similarly supported by a pair of angle bars 107 and 109 which have end plates resting upon similar blocks (not shown) welded to the channels.

As shown best in Figure 5, the end of engine 1 is attached to the supporting frame by a pair of web members 111 which extend upwardly along Z-member 102 and which are held to the Z-member by a pair of bolts 113. Referring to Figure 3, generator 2 is held from longitudinal movement by bolts 115 which extend through channels 8 and the end plates on angle bars 107 and 109. The coupling between the engine and generator is readily separable by merely moving either of the elements longitudinally away from the other. Thus, to remove the engine, bolts 302 and 113 (Figure 5) are removed and the engine is slid longitudinally a sufficient distance to disengage the coupling and move brackets 105 to the side of the supporting blocks; the engine is then moved downwardly. Likewise, the generator may be removed by removing bolts 115 and moving the generator away from the engine to disengage the coupling and to move the ends of the angle bars away from the supporting blocks.

The engine 1 (Figure 1) is adapted to operate on compressed or liquefied petroleum gas or other suitable fuel and is air cooled. The fuel is illustratively propane, and the supply is carried in a liquid state under pressure in four steel cylinders 29 (only two of which are shown). The cylinders are in a suitable rack 30 attached to the car underframe, and the construction of the rack is such as to hold the cylinders securely in position and yet provide for easy replacement of empty cylinders with full ones. Each cylinder is provided with a valve 31 and a fusible plug (not shown) and is connected to the main fuel line 33 by branch line 34. Each branch line includes a check valve 35 which prevents gas flow into the cylinder; a pressure regulator 36 which reduces the pressure from that in the cylinder to a pressure suitable for use at the mixing valve; an excess flow shut-off valve 37 which automatically closes when the gas velocity exceeds a certain value to thereby prevent escape of gas in the event the supply line is ruptured; and a hand shut-off valve 38. Each of the several regulators 36 is set to maintain an outlet pressure differing by a small amount from the pressure settings of the other regulators. In so far as a regulator will not pass gas if the pressure at its outlet is above the pressure for which it is set, gas can only be supplied by the regulator which is set for the highest pressure. Thus, when all of the cylinders are filled, gas will be supplied by the cylinder upon which the regulator has the highest setting, and when this cylinder is empty, the cylinder for the regulator having the next to the highest setting will start supplying gas. A pressure gauge 40 is connected to the main line 33, and this gauge will always indicate the pressure of the regulator from which gas is then being supplied. Thus, by knowing the settings of the regulators of the various cylinders, the service may may immediately determine which, if any, of the cylinders have been emptied.

The engine is of the horizontal opposed cylinder type, and it is provided (see Figure 5) with a muffler 14, a magneto 15, an oil gauge 16, a fuel mixing valve 17, an air cleaner 18, a governor 19, and a governor control 20. The gaseous fuel from the fuel supply system enters a pressure regulator which reduces the pressure to a proper constant value which is supplied to the fuel mixing valve 17. Under the action of the suction created in the intake valve, air is drawn through the cleaner 18 to the mixing valve, where it is mixed with the gas, and the mixture passes to the cylinder intake valves. The speed of the engine is controlled by varying the position of a butterfly valve and intake manifold or throttle box, and thus the ratio of fuel to air in the mixture.

The mixing valve is controlled by the governor to maintain a substantially constant engine speed. Accordingly, a rod 117 extending from the mixing valve is connected at its forward end to a swinging lever 22. Lever 22 is fixed to the governor shaft 119, which is rotated by the governor to swing lever 22 and thus change the setting of the mixing valve. Directly over the governor is a tension spring 106 which is carried at one end (see Figure 7) by a spring lever 121 fixed to the governor shaft 119 and at the other end by a swinging arm 123 pivoted on the engine frame at 125. At slow speeds the governor is ineffective, but as the engine reaches the speed for which the governor is set, shaft 119 is rotated counterclockwise (Figure 7) and thus cuts down on the fuel supply and holds the engine speed constant. This action of the governor is in opposition to spring 106, and the engine speed can be increased by increasing the tension on spring 106, or on the contrary, the engine speed can be decreased by decreasing the tension on the spring.

The swinging movement of swinging arm 123 is limited by a pair of set screws 127 and 129 which engage suitable stops on the engine frame. Under some circumstances it is desirable to modify the action of the governor so as to change the engine speed, and in this embodiment the engine speed is increased when compressor 3 is operated. Accordingly, swinging arm 123 is connected through a link 131 to armature 24 of the governor control unit 20. Governor control unit 20 has a solenoid 23 and a core 133, and when the solenoid is energized, armature 24 swings clockwise about its pivot 135 toward alignment with core 133. This movement of armature 24 swings arm 123 clockwise to engage set screw 127 with its stop, and this extends spring 106 to the extent that the tension on the spring is materially increased. With the increased tension on spring 106, governor 19 will not come into action until the higher engine speed is reached.

The electric generator 2 is a direct current generator with a shunt field, and its output is regulated by a voltage-current regulator and a reverse current relay. The generator is operated as a motor to crank the engine, and for this purpose it is provided with a series field winding all to be more fully discussed below. Compressor 3 is a four cylinder V-type high speed reciprocating compressor, and it is mounted on the end of the generator frame by a spider-cone 25. Within this spider-cone is a magnetic clutch, indicated at 7, which is energized upon demand to connect the shaft of the compressor to the shaft of the generator.

Figure 1:
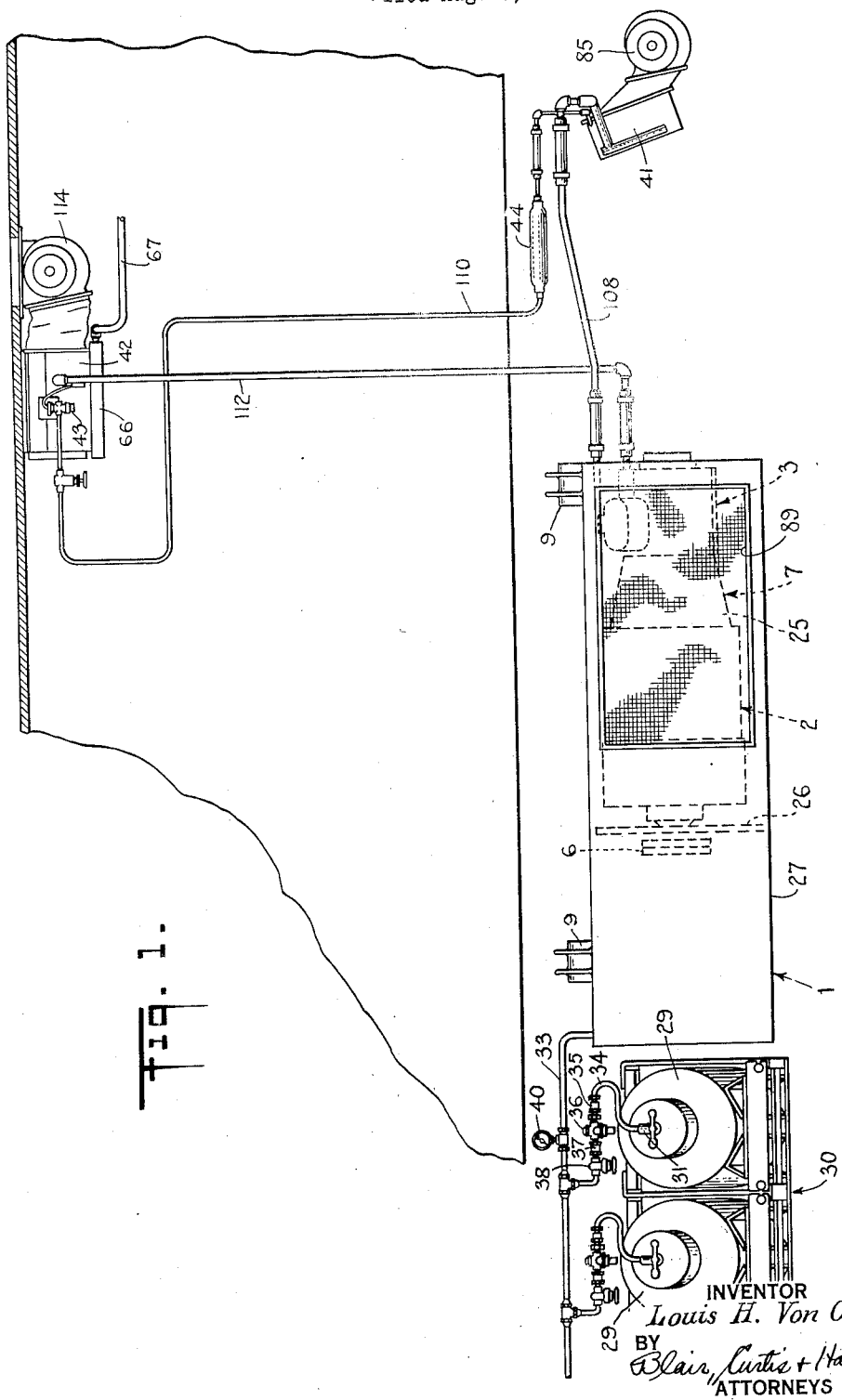
Figure 1 is a schematic side view of a portion of a railway car showing a system constituting one embodiment of the present invention.

As shown in Figure 1, a casing is provided about the unit, and extending between the engine and the generator is a diaphragm 26 which divides the space laterally. The sides of the casing adjacent the compressor 3 are provided with screened openings 89 for the admission of air, and (see Figure 5) beneath the engine in the bottom of the casing is an air outlet 27. A fan (not shown) is mounted on the engine shaft adjacent coupling 6 (Figure 1) and draws air through an opening in the center of diaphragm 26 from over the compressor and generator and discharges the air past the engine and through opening 27.

The refrigeration system is shown schematically at the right-hand side of Figure 1. When compressor 3 is operated, the high-pressure gas is delivered through a pipe 108 to a condenser 41 where the gas is liquified, and it passes upwardly through a pipe 110 and through an expansion valve 43 to an evaporator 42. The liquid refrigerant is evaporated in the evaporator and returns to the compressor through a pipe 112, whereupon the cycle is repeated. Additional equipment is provided to improve the efficiency and the operating characteristics of the unit. For example, the liquid refrigerant passes through a sub-cooler and a liquid strainer 44, and suitable cut-off valves are provided. Cooling is provided for the condenser by a condenser fan 85 which blows air over the condenser, and when desirable, a water spray is provided by causing the blast of air to pick up water before it passes over the condenser. Air is circulated over the evaporator by a fan 114, and water condensing on the evaporator is collected in drip pan 66 and is returned through a conduit 67 to the body of water which is used to cool the condenser.

Figure 2:
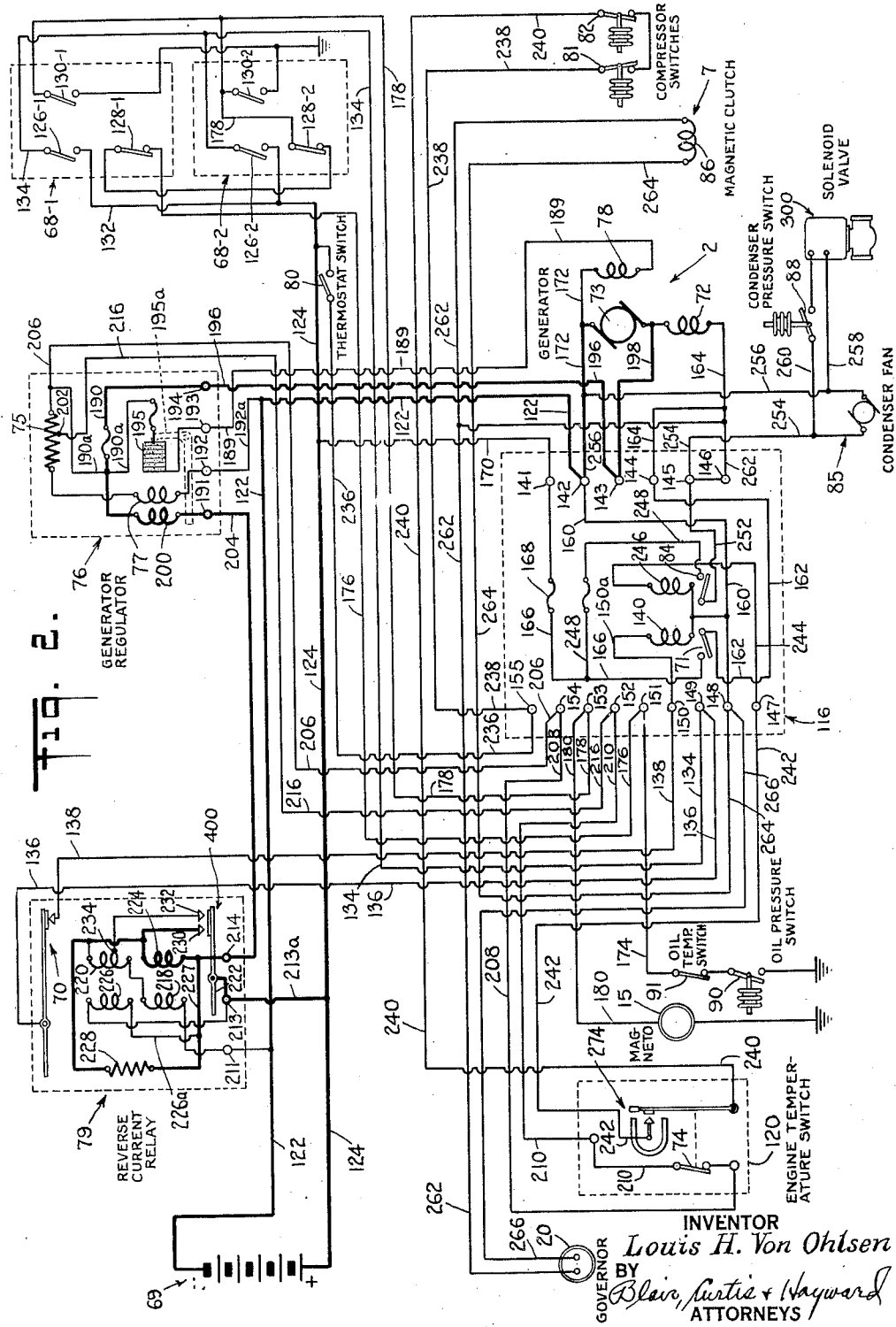
Figure 2 is a partial schematic wiring diagram of the control for the system of Figure 1.

The control circuit for the system is shown in Figure 2 which is largely schematic, but, as will be seen by referring to Figures 1 and 3, Figure 2 shows to a certain extent the relative positions of the various associated units of the system. In the lower central portion of the figure, the main control panel 116 is outlined in broken lines, and this forms the center through which the various units of the system are connected. At the left of the control panel are the units associated with the engine, there being a magneto 15, a governor control unit 20, an engine temperature switch assembly 120, a normally closed oil temperature switch 91, and a normally open oil pressure switch 90. Governor control unit 20 is provided with a solenoid, and as indicated above, this solenoid is energized to change the operating speed of the engine. Oil switches 90 and 91 are in series with the ignition system of the engine so that the engine will not operate when there is no oil pressure or when the oil temperature is raised beyond the danger point. Thus, when cranked, the engine will not continue to run if the oil pressure does not build up satisfactorily, and the engine stops when the oil fails or when the oil temperature rises. It is important that the load on the engine be light after starting until the engine has warmed up sufficiently. Accordingly, the engine temperature switch assembly 120 limits the electrical load on the generator and prevents the operation of the compressor until the engine temperature is raised to the proper value.

Referring to the upper left-hand portion of the figure, the car battery 69 is connected across the power lines 122 and 124, and the car lights and auxiliaries are connected across these lines. A reverse-current relay 79 is provided which is of the type shown in my U. S. Patent No. 2,179,651, issued November 14, 1939, entitled "Electrical system," and to the right of relay 79 is a generator regular 76 which controls the output of the generator. To the right of panel 116, the generator 2 is provided with an armature 73, a shunt winding 78, and a series winding 72, and beneath the generator is represented the condenser fan 85 which provides for cooling of the condenser.

Condenser fan 85 is connected in parallel with the circuit of solenoid valve 300 which has connected in series with it a condenser pressure switch 88. Solenoid valve 300 controls the supplying of water for evaporative cooling of the condenser 41 as water is not supplied except when the condenser pressure is high enough to close the normally open condenser pressure switch 88. Thus, when the operating conditions are relatively light, the operation of fan 85 alone is sufficient to cool the condenser, but when the refrigeration load is heavy or the external temperature is high, the condenser pressure rises to close switch 88, thereby opening valve 300 and supplying water for evaporative cooling.

At the right of generator 2 is the magnetic clutch 7 having a coil 86 which is energized to close the clutch. Mounted adjacent to the compressor to the right of clutch 7 are the normally closed high-pressure switch 81 and the low-pressure switch 82 which are opened to stop the operation of the compressor when the pressure conditions indicate that operation would be dangerous or undesirable. High-pressure switch 81 has its pressure element connected to the output side of the compressor so that when the pressure rises to an abnormally high value, the switch is opened; and low-pressure switch 82 has its pressure element connected to the intake side of the compressor so that when the intake pressure of the compressor drops below a predetermined value, this switch is opened.

Above generator 2 is the car thermostat switch 80 which is closed when refrigeration is desired. To the right of switch 80 are represented two stop-start stations 68—1 and 68—2 which are identical and are referred to collectively as stop-start stations 68, which in practice are located at opposite ends of the car so that the operation of the unit can be controlled at either of these locations. The units of station 68—1 are given the suffix —1, and the corresponding units of station 68—2 are given the suffix —2. Stop-start station 68—1 includes a normally open starting switch 126—1, a normally closed stopping switch 128—1, and a normally open relay switch 130—1. One side of switch 126—1 is connected through lead 132 to the positive power line 124, and the other side of the switch is connected through a lead 134 to terminal 149 on control panel 116, which is connected through a lead 136 to a normally closed switch 70 interlocked with the reverse-current relay 79. The other side of switch 70 is connected through a lead 138 to terminal 150 on the control panel and thus by a lead 150a to one side of solenoid 140 of relay switch 71. The other side of solenoid 140 is connected through lead 160 to a terminal 142 on the control panel which is connected to the negative power line 122. Relay switch 71 has one side connected through a lead 162 to terminal 144 and thus through lead 164 to the series coil 72. The other side of switch 71 is connected through a lead 166 having a fuse 168 therein to terminal 141 and thus through a lead 170 to the positive power line 124. Armature 73 has one side connected to series coil 72 and the other side connected through a lead 172 to terminal 142 and thus to the negative power line 122.

It may now be seen that the closing of either starting switch 126 completes the following circuit: battery 69, negative power line 122, terminal 142, lead 160, solenoid 140, lead 150a, panel terminal 150, lead 138, switch 70, lead 136, panel terminal 149, lead 134, switch 126—1 or switch 126—2, lead 132, and positive power line 124 to the positive side of battery 69. Completion of this circuit, as noted above, energizes solenoid 140 to close relay switch 71 to establish a circuit, which impresses the full voltage of power line 122 and 124 across armature 73 and series field winding 72 of generator 2. This circuit is as follows: one side of switch 71, lead 166, fuse 168, panel terminal 141, lead 170, positive power line 124, battery 69, negative power line 122, panel terminal 142, lead 172, armature 73, series field winding 72, lead 164, panel terminal 144 and lead 162 to the other side of relay switch 71. It will now be seen that completion of this circuit causes the generator to operate as a motor to crank the engine.

The cranking of the engine turns magneto 15 so as to supply ignition for the engine, and the oil pump builds up sufficient pressure to close oil switch 90; this completes a circuit from the grounded side of the magneto through switches 90 and 91, a lead 174, terminal 151, a lead 176 through the stop switches 128 of the stop-start stations 68, lead 178, terminal 153, and lead 180 to the other side of the magneto. It accordingly will be seen that if the oil pressure drops below a predetermined minimum, or if the oil temperature rises above a predetermined maximum, the circuit to magneto 15 is broken and accordingly the engine is stopped before it can be damaged. With the engine thus cranked and with proper ignition supplied by the magneto, the engine starts and the starting button is released. However, as will be more fully explained below, the generator voltage builds up rapidly and closes the reverse-current relay 79, causing switch 70 which is in series with the starting switch to open, and the circuit is thereby broken. The closing of either of the starting switches 126 during operation does not interfere with proper operation of the unit.

After the starting period and during the running period the entire field for the generator is supplied by the shunt field winding 78 through the following circuit: shunt winding 78, lead 189, current regulator terminal 193, variable resistance carbon pile 195 of regulator 76, lead 190a, fused lead 190, terminal 194, lead 196, panel terminal 143, lead 198, generator armature 73 and lead 172 to the other side of shunt winding 78. Regulator 76 is conventionally provided with a current coil 200 which carries the generator load current, a voltage coil 77 which has impressed across it the generator voltage, and a resistor 75 connected in series with coil 77 and having a tap 202.

Current coil 200 is included in the following circuit: one side of coil 200, fuse lead 190, terminal 194, lead 196, panel terminal 143, lead 198, generator armature 73, lead 172, panel terminal 142, negative power line 122, battery 69, positive power line 124, lead 213a, reverse current relay terminal 213, walking beam 222, main switch contact 230, coil 224, terminal 214, lead 204, regulator terminal 191, and the other side of coil 200.

Voltage coil 77 has one side connected to terminal 192 and thus to the negative power line 122 and the other side connected to resistor 75. Resistor 75 has its other end connected through a lead 206 to terminal 154 on panel 116 and thus through lead 208 to the normally closed switch 74 of the engine temperature switch 120, and the other side of switch 74 is connected through lead 210 to terminal 152 which is connected through a lead 216 to the tap 202 on resistor 75.

Carbon pile 195 is normally held compressed by a spring (not shown), and a leverage mechanism 195a is provided which is operated by the magnetic flux of coils 200 and 77 and opposes the action of this spring. Thus, the resistance of the carbon pile is increased when either a high current flows through coil 200 or when there is a high voltage impressed across coil 77; this increase in the resistance of the carbon pile causes a decrease in the current through the shunt field winding 78 of the generator. The regulator is so adjusted as to exert the proper regulating effect when the entire resistor 75 is in series with the voltage coil 77. When the engine is hot and switch 74 of the engine temperature switch 120 is accordingly open, the entire resistor is in series with coil 77. When the engine is cold and switch 74 of engine temperature switch 120 is closed, the circuit through tap 202 is completed, as described above, and this shorts out a portion of resistor 75 and thereby throws a larger proportion of the generator voltage onto the voltage coil 77. This causes the voltage coil to become effective and reduce the generator field current to a lower value than it otherwise would, and as a result the generator is not permitted to assume its normal load. This definitely limits the load upon the engine with the result that the engine is permitted to warm up under a load which it can carry without danger of injury or stalling.

The operation of the reverse-current relay 79 is explained fully in my patent referred to above. The negative power line 122 is connected to terminal 211 so as to supply current to the potential coils 218 and 220 which are connected in series, and in addition to the terminal 214 referred to above, a terminal 213 is connected to the positive power line 124. A walking beam 222 is pivoted to move a main switch generally indicated at 400 to and from a circuit closing position, and when the main switch is closed, the generator is connected to supply current to the power lines 122 and 124 for charging the batteries and for operating the lights and auxiliaries. Terminal 213 is connected to one side of a potential coil 226 and thus by leads 226a and 227 to terminal 214. Terminal 213 is also connected to the walking beam so that when the switch 400 is closed, the positive lead 124 is connected through the main switch contact 230 to the current coil 224. When the switch is closed, an auxiliary contact 232 connects the positive line 124 to a tap 234 on coil 220. This decreases the effect of coil 220 and increases the effect of coil 218, all in the manner explained in my patent. Current coil 224 tends to hold the switch closed, and when the switch is open, potential coil 226 bridges the open switch and assists in holding the switch open as long as the voltage across lines 122 and 124 is above the value of the generator voltage. A resistor 228 is connected in parallel with coil 224 to carry a substantial portion of the load current. The armature switch 70 is mechanically interlocked with the walking beam so that switch 70 is opened when the reverse-current relay switch 400 is closed.

When relay switch 400 is closed, the following circuit is established: generator armature 73, line 198, panel terminal 143, line 196, regulator terminal 194, fuse line 190, current coil 200, terminal 191, lead 204, relay current 214, coil 224, main switch contact 230, walking beam 222, terminal 213, lead 213a, positive power line 124, battery 69, negative power line 122, panel terminal 142 and lead 172 to the other side of generator armature 73. Thus it will appear that when main switch 400 of the reverse current relay 79 is closed, the generator is connected across the power lines so as to charge battery 69.

The car thermostat switch 80 has one side connected to the positive power line 124, and the other side is connected through a lead 236 to terminal 155 on panel 116 and thence through a lead 238 to the pressure switches 81 and 82. The other side of the pressure switches is connected through a lead 240 to the engine temperature switch 274, the other side of which is connected through a lead 242 to terminal 147 on panel 116 and thence through a lead 244 to one side of solenoid 246 of switch 84. The other side of solenoid 246 is connected to lead 160, referred to above, which is connected through terminal 142 to the negative power line 122. Thus when thermostat switch 80, engine temperature switch 274, and the compressor switches 81 and 82 are all closed, solenoid 246 is energized to close switch 84.

Switch 84 has one side connected through a fused lead 248 to the fused lead 166, which is connected through terminal 141 to the positive power line 124, and the other side of switch 84 is connected through lead 252 to terminal 145 and through a lead 254 to the motor 85 of the condenser fan. The other side of motor 85 is connected through a lead 256 to terminal 142 and thus to the negative power line 122. It accordingly follows that closing of switch 84 completes the circuit of fan motor 85. It also follows that if thermostat switch 80 or either of compressor switches 81, 82 is open, the condenser fan cannot operate.

The solenoid valve 300 is connected in parallel with fan motor 85, a lead 258 connecting lead 256 to the solenoid and a lead 260 connecting lead 254 through the condenser pressure switch 88 to the solenoid. Thus, when the fan is operating, the solenoid valve 89 will be opened if the condenser pressure rises to the value sufficient to close switch 88.

Panel terminal 145 is connected directly to terminal 146, and extending from terminal 146 is a lead 262 which extends upwardly and to the right to the solenoid 86 of the magnetic clutch unit 7, and which extends to the left to the governor control unit 20. The other side of solenoid 86 is connected through a lead 264 to terminal 148 of panel 116 and thus through lead 160 and terminal 142 to the negative power line 122, and in a like manner the other side of the governor control unit 20 is connected through a lead 266 to terminal 148 and to the negative power line 122.

As terminal 145 is connected to switch 84 by lead 252, and as the switch is connected by leads 248, 166 and 170 to positive power line 124, the circuits to clutch solenoid 86 and governor control 20 are energized when switch 84 is closed by solenoid 246. Hence the governor control and magnetic clutch 7 are under the control of thermostat switch 80, compressor switches 81 and 82 and engine temperature switch 274. If any of these switches is open, clutch 7 is deenergized to disconnect the compressor from the generator and the governor control 20 is inoperative.

When engine 1 is driving the generator and refrigeration is not required, switch 80 remains open, and the engine produces sufficient power to drive the generator at the proper speed. However, due to the load-speed characteristic of the engine, when the compressor and the generator are both driven, it is desirable to increase the engine speed. Accordingly, when switch 80 closes the governor control unit 20 is energized to increase the engine speed at the same time that the magnetic clutch is energized to drive the compressor. Furthermore, fan 85 is started, and if the condenser pressure builds up, switch 88 closes to supply water for evaporative cooling of the condenser. The various safety means remain effective to stop the operations if undesirable conditions exist in any of the units, all in the manner outlined about. Illustratively, the high pressure switch 81 and the low pressure switch 82 are effective to deenergize the magnetic clutch 7 and stop the compressor if either of the switches is open, and the temperature switch 274 prevents the starting of the compressor until the engine temperature has risen to a point where the engine will carry the load of the generator and the compressor.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. In a railway car power system, the combination of, an internal combustion engine, an electric generator directly connected to said engine, a power driven unit of a refrigeration system, means to connect said internal combustion engine to drive said power driven unit, and control means for the apparatus to control the operation and including safety means responsive to the condition of said internal combustion engine to prevent the operation of said power driven unit when said internal combustion engine is incapable of assuming the load.

2. In a railway car power system, the combination of, an internal combustion engine, an electric generator, a power driven unit of a refrigeration system, and control means to connect said power driven unit to said engine and to maintain an increased speed of the engine upon the connecting of said power driven unit to the engine.

3. In a railway car power system, the combination of, an internal combustion engine, a governor controlling the speed of said engine, a generator adapted to be driven by said engine, a compressor adapted to be driven by said engine, and control means responsive to the load demand on said engine to modify the operation of said governor and thereby modify the operation of the engine in accordance with the load demand on said engine.

4. In railway car construction, the combination of, a frame construction, an internal combustion engine mounted on said frame construction, a generator mounted on said frame construction and adapted to be driven by said engine, a compressor mounted on said generator and adapted to be connected to be driven by said engine, and a speed control means to control the speed of said engine and effective to modify the engine speed in accordance with the desired operation of said compressor.

5. In a railway car power system, the combination of, an internal combustion engine, a generator and compressor adapted to be driven by said engine, a governor to control the operation of said engine and having an operating shaft which is rotated to effect the control, a spring assembly tending to rotate said shaft in one direction, and means responsive to load demands to change the spring tension of said spring assembly in accordance with the load demands by said generator and compressor.

6. In a railway car power system, the combination of, an internal combustion engine, a generator and compressor adapted to be driven by said engine, a governor to control the operation of said engine and having an operating shaft which is rotated to effect the control, a spring arm mounted on said shaft, a coil spring having one end attached to said spring arm and having the other end connected to a movable pivot, a solenoid, an armature rockably mounted to be swung upon the energization of said solenoid, and means operatively connecting said armature with said movable pivot whereby the energization of said solenoid moves said movable pivot and changes the tension on said spring to modify the operation of said governor.

7. In a railway car power system, the combination of, an internal combustion engine, a compressor, an electromotive machine having a shunt field winding which supplies flux so that the machine may be operated as a generator and a series field winding to supply flux adapting said electromotive machine to operate as a motor, means to mechanically connect said compressor and said electromotive machine to said engine, a storage battery system, and control means to connect said electromotive machine to said storage battery system to operate as a motor to crank said engine and to then connect said electromotive machine to act as a generator to supply current to said storage battery system, said control means including an interlock switch which is closed to condition said electromotive machine to operate as a motor and which is opened when said electromotive machine is connected to act as a generator and supply current to said storage battery system.

8. In a railway car power system, the combination of, an engine having a magneto, circuit means to close the circuit of said magneto including an oil temperature switch which is opened when the oil temperature exceeds a predetermined safe value and an oil pressure switch which opens when the oil pressure drops below a predetermined value, an electromotive unit mechanically realted to said engine and being adapted to act as a motor to crank said engine and to act as a generator driven by said engine, and control means to connect said generator to act as a motor to crank said engine whereby the oil pressure is raised and said oil pressure switch is closed and said magneto is operated to provide ignition for said engine, said control means including means to connect said generator to deliver current to a power system and to simultaneously prevent the closing of the circuit for operating said generator as a motor.

9. In a railway car power system, the combination of, a horizontally extending rigid frame construction, an internal combustion engine suspended therefrom, a motor generator unit mechanically connected to said engine and suspended from said frame construction, a load power system to receive power from said motor generator when said motor generator is driven by said engine and to supply power to said motor generator to cause said motor generator to crank said engine, and control means to control the operation of said engine and said motor generator and to control the connection and disconnection of said motor generator to said load power system, said control means including a panel extending downwardly from one side of said frame construction through which panel the various circuits of the control means are connected.

10. In a railway car power system, the combination of, a horizontally extending supporting frame formed by a pair of longitudinal channel members and a pair of cross-frame members, an internal combustion engine rigidly suspended from one end of said supporting frame and having a crank shaft extending longitudinally of said supporting frame, a generator rigidly suspended from the central portion of said supporting frame and having its rotating axis in alignment with the crank shaft of said engine, coupling means to mechanically connect said generator to said engine, a compressor mounted upon the end of said generator opposite said engine and having its driving shaft in alignment with the shaft of said generator, coupling means to connect the shafts of said generator and said compressor, an electrical power circuit associated with said engine and said generator, a plurality of control circuits for the apparatus including a plurality of individually operating control units, and a control panel rigidly suspended from one side of said supporting frame along the side of said generator and having thereon a plurality of circuit terminals to which said circuits are connected.

11. In a railway car power system, the combination of, a motor, an electromotive unit mechanically connected to be driven by said motor, a compressor mechanically related to said motor to be driven thereby, an electric system adapted to receive electrical power from said electromotive unit, control means comprising a plurality of individually operating control units which are adapted to automatically control the various operations of the apparatus to permit operation under normal conditions and to prevent operation under conditions where the apparatus might be injured, manually operable means to permit supervisory control of the apparatus, a control panel having a plurality of connecting terminals thereon, and a plurality of circuits constituting a control network connecting said control units and said manually operable means to each other through terminals on said control panel.

12. Apparatus as described in claim 9 wherein said engine and said motor generator unit are mounted with their shafts in alignment and are connected by a coupling and wherein a fan is mounted upon the engine shaft adjacent said coupling to draw air in about said motor generator unit and to discharge air about said motor.

LOUIS H. VON OHLSEN.